United States Patent
Huang et al.

(10) Patent No.: US 7,035,098 B2
(45) Date of Patent: Apr. 25, 2006

(54) FAST HARD DISK PLUGGING AND REJECTING DEVICE

(76) Inventors: Jui-Shu Huang, No. 203, Sec. 1, Renhe Rd., Dasi Township, Taoyuan County (TW); Chu-Wen Tai, No. 17-1, Sinsing Rd., Beitun District, Taichung City (TW)

( * ) Notice: Subject to any disclaimer, the term of this patent is extended or adjusted under 35 U.S.C. 154(b) by 293 days.

(21) Appl. No.: 10/735,757

(22) Filed: Dec. 16, 2003

(65) Prior Publication Data

US 2005/0128919 A1 Jun. 16, 2005

(51) Int. Cl.
*G06F 1/16* (2006.01)

(52) U.S. Cl. ...................................... 361/685; 361/683
(58) Field of Classification Search ................ 361/683, 361/685
See application file for complete search history.

(56) References Cited

U.S. PATENT DOCUMENTS 5,400,198 A * 3/1995 Suzuki et al. ............ 360/99.06
5,652,695 A * 7/1997 Schmitt ....................... 361/685
5,684,776 A * 11/1997 Davis et al. ................. 720/635
6,853,546 B1 * 2/2005 Rabinovitz .................. 361/685
6,934,119 B1 * 8/2005 Kohyama et al. ........ 360/99.06

* cited by examiner

*Primary Examiner*—Yean-Hsi Chang
(74) *Attorney, Agent, or Firm*—Rosenberg, Klein & Lee

(57) ABSTRACT

A fast hard disk plugging and rejecting device is disclosed. Two sides of the bottom cover are respectively connected with a side covering plate, a back side thereof is connected with the backside covering plate, and a front side thereof is connected with the panel, an exiting button is set at one side of the panel, the guiding plate is mounted behind the panel and has a guiding rail which has a relatively larger upper space and relatively smaller lower space for different standards of different hard disks. A connector (IDE) is positioned at a back end of the guiding plate, and a partition is further connected to the connector, wherein each contacting hole (PIN) inside the connector is embedded by a probe and a spring. And, an exiting mechanism is mounted at one side of the guiding plate which is oppositely contact with the exiting button. Finally, after combining with the upper cover, the fast hard disk plugging and rejecting device is achieved.

4 Claims, 8 Drawing Sheets

FAST HARD DISK PLUGGING AND REJECTING DEVICE

BACKGROUND OF THE INVENTION

1. Field of the Invention

The present invention relates to a fast hard disk plugging and rejecting device, and more particularly to a fast hard disk plugging and rejecting device outside a computer case.

2. Description of the Prior Art

Because the conventional connecting head of the hard disk can not be rapidly plugged or rejected, it has to be performed manually. However, an insufficient or uneven force always causes an insufficient contact so as to disable the hard disk, or an incorrect assembling direction may cause a damage of the probe of the hard disk. Furthermore, generally, it has to employ a bigger force for connecting or separating the hard disk, and this will be an operational difficulty for the user having a smaller hand or a smaller strength. Therefore, an elastic probe can be employed to connect the hard disk for overcoming the conventional operation difficulty so as to ensure that the connection quality will not be influenced by the operator and the connection can be achieved semi-automatically.

In addition, in the past, the hard disk is always built-in the computer or formed as an external box for storage or reading, as shown in FIG. 1. If the user wants to take the hard disk 11 out of the removable hard disk box 1, it has firstly to turn the handle 12 up and pull it out for departing the hard disk from the case, then the user takes off the upper cover 13 from the box 1 and pulls the converter 14 which is connected to the hard disk 11 for completely taking the hard disk out. Furthermore, before performing this operation, it has to turn off the computer first, and it is also impossible to reject or plug the hard disk as the computer is running.

Thus, it can be seen, the prior art described above still has some defects, is not a good design, however, and is urgently to be improved.

Because of the technical defects of described above, the applicant keeps on carving unflaggingly to develop a fast hard disk plugging and rejecting device through wholehearted experience and research.

SUMMARY OF THE INVENTION

One objective of the present invention is to provide a good mobility and removability of a fast hard disk plugging and rejecting device through an elastic probe embedded at each contacting hole inside a connector of the device, and therefore, the probe in the connector and a connecting head of the hard disk are conducted through a pressed contact there between when the hard disk is plugged therein, and the hard disk can be fast exited by utilizing the exiting mechanism.

Another objective of the present invention is to provide a fast hard disk plugging and rejecting device, which can be adapted to different standards of the hard disk in the market.

Another further objective of the present invention is to provide a fast hard disk plugging and rejecting deice through which the user can easily and rapidly reject the hard disk so as to save labor and avoid a damage to the hard disk when the user plugs and rejects the hard disk through the conventional way.

For achieving the purposes described above, the fast hard disk plugging and rejecting device includes: an upper and a bottom covers, a panel, a backside covering plate, a side covering plate, a guiding plate, a partition, an exiting button, an exiting mechanism and a connector, wherein two sides of the bottom cover are respectively connected with a side covering plate, a back side thereof is connected with the backside covering plate, and a front side thereof is connected with the panel, a plugging and rejecting opening is positioned at the central portion of the panel, a rotary lifting dust cover is mounted at the plugging and rejecting opening, the exiting button is set at a proper position on the side of the panel, the guiding plate is mounted behind the panel and has a guiding rail which has a relatively larger upper space and relatively smaller lower space for different standards of the hard disk, a connector is positioned at a back end of the guiding plate, the partition is further connected to the connector, each contacting hole inside the connector is embedded by an elastic probe, and the exiting mechanism is mounted at one side of the guiding plate which is active when operate the exiting button. After combining with the upper cover, the fast hard disk plugging and rejecting device is achieved.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
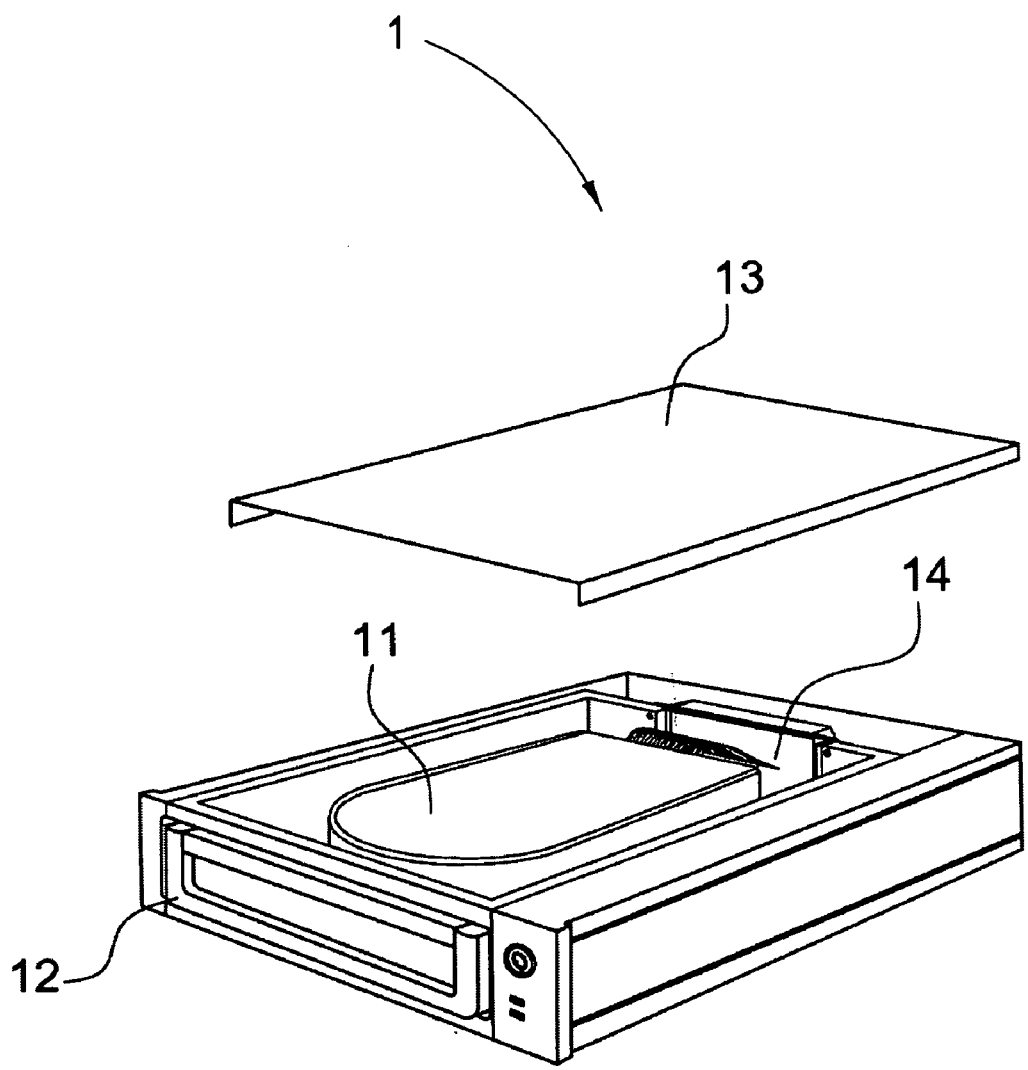
FIG. 1 is a decomposition drawing of a conventional removable hard disk.
Figure 2:
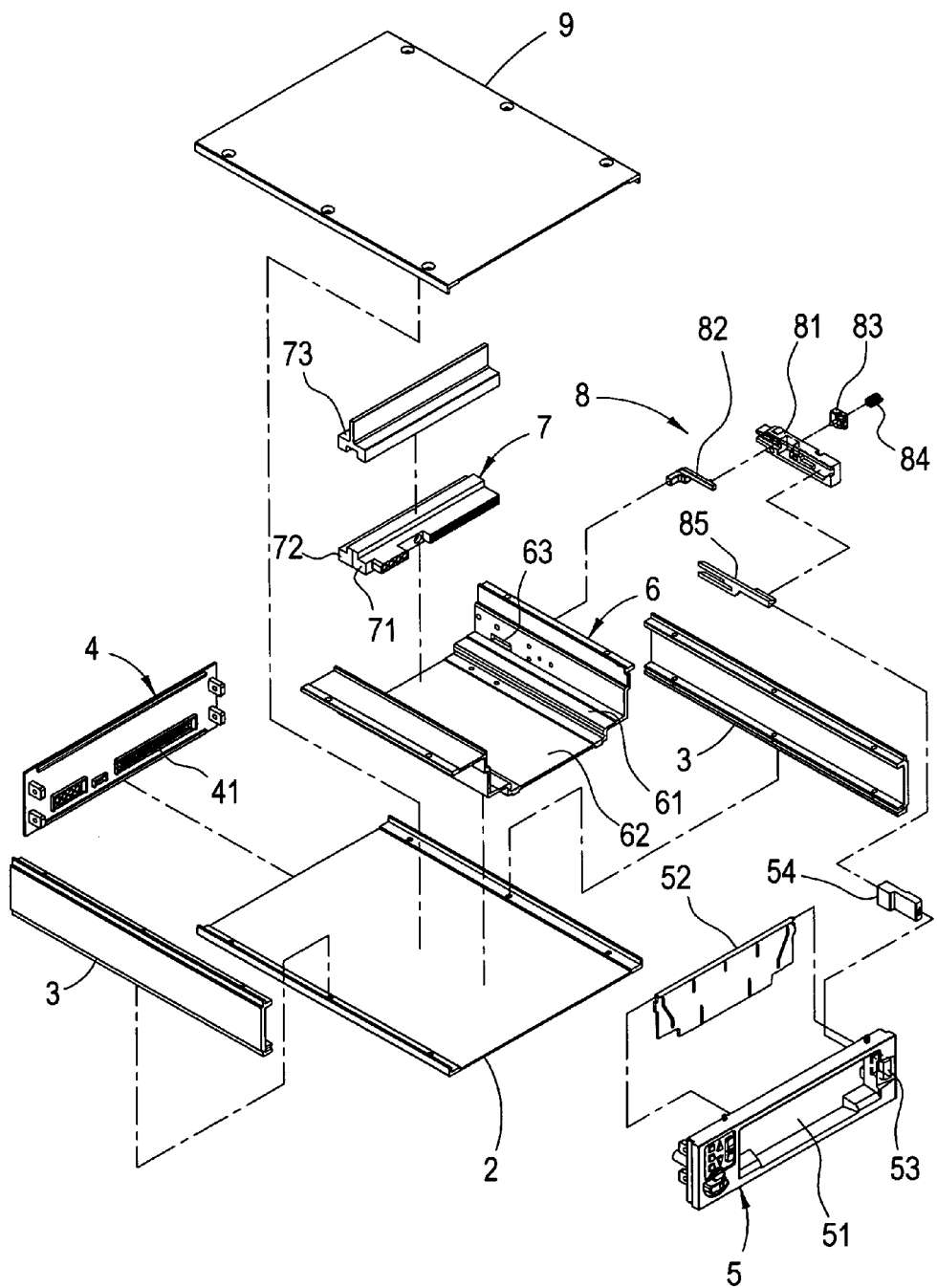
FIG. 2 is a three-dimensional decomposition drawing showing a fast hard disk plugging and rejecting device according to the present invention.
Figure 3:
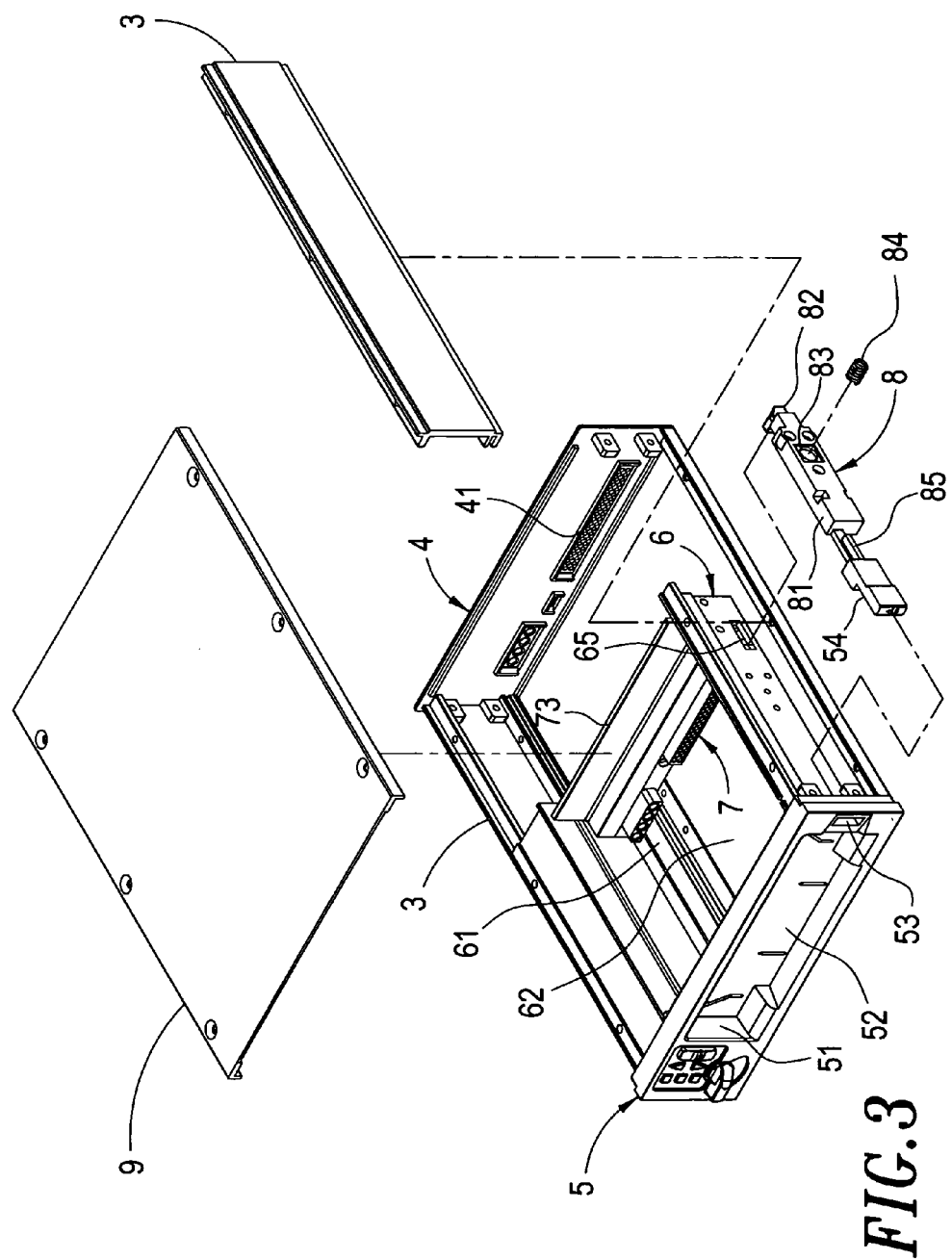
FIG. 3 is a partial assembling drawing showing a fast hard disk plugging and rejecting device according to the present invention.
Figure 4:
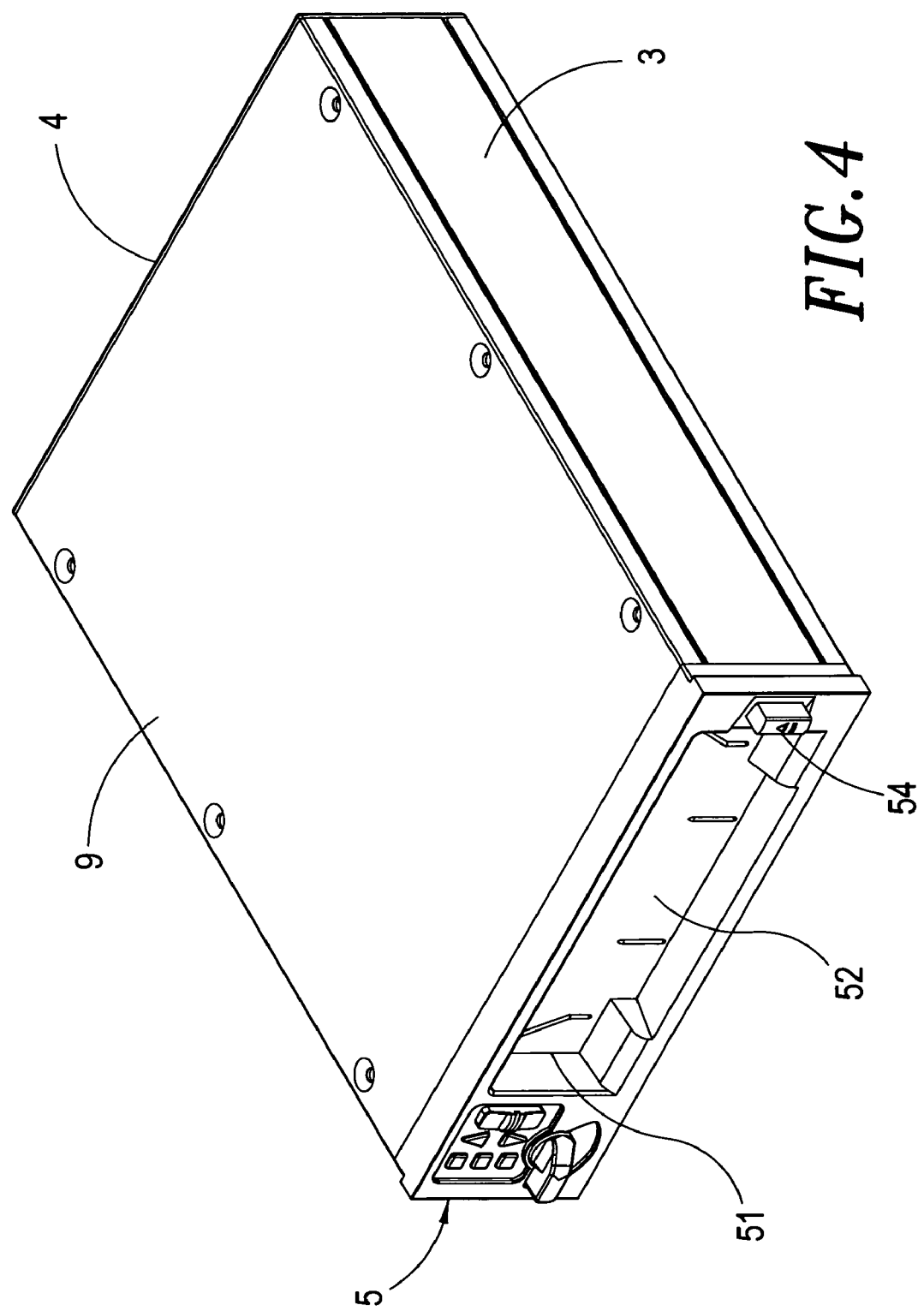
FIG. 4 is a three-dimensional assembling drawing showing a fast hard disk plugging and rejecting device according to the present invention.
Figure 5:
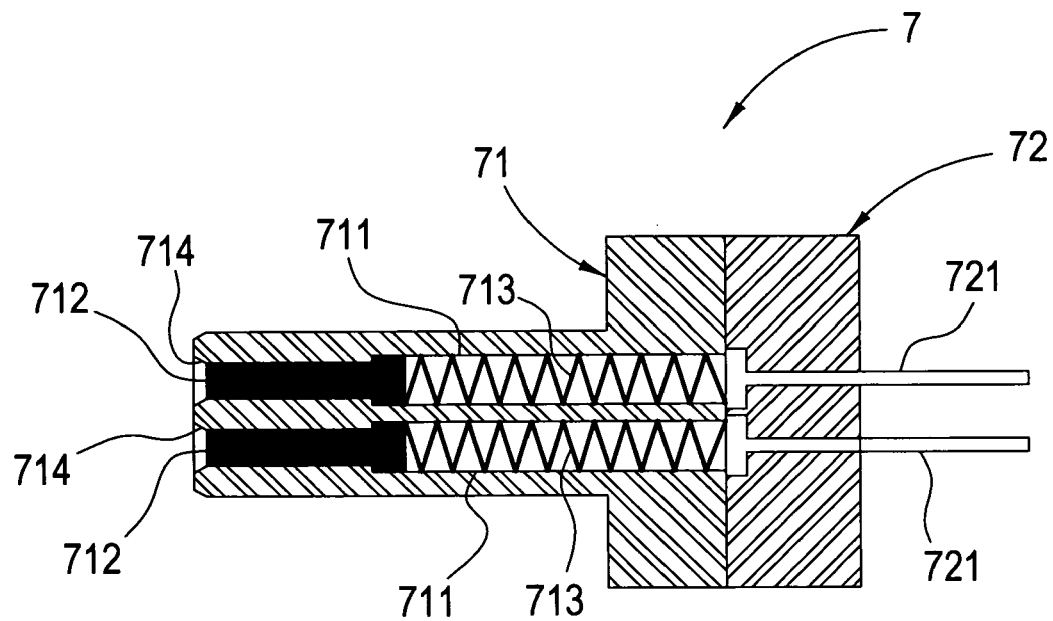
FIGS. 5A~5B are action schematic views showing a spring and a probe in a connector of a fast hard disk plugging and rejecting device according to the present invention.
Figure 5:
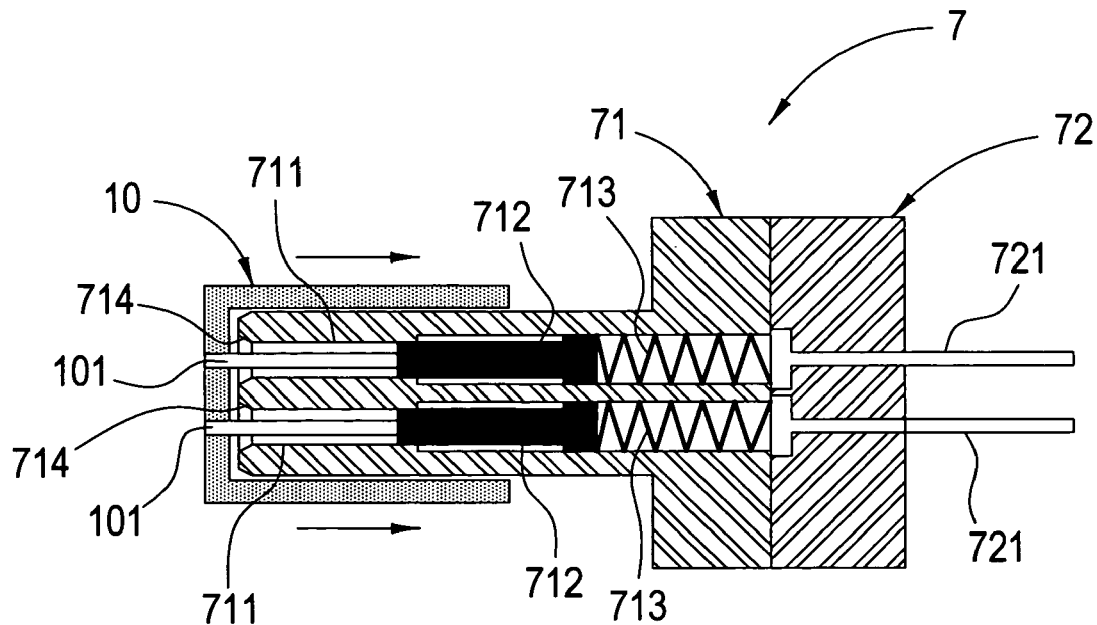
Figure 6:
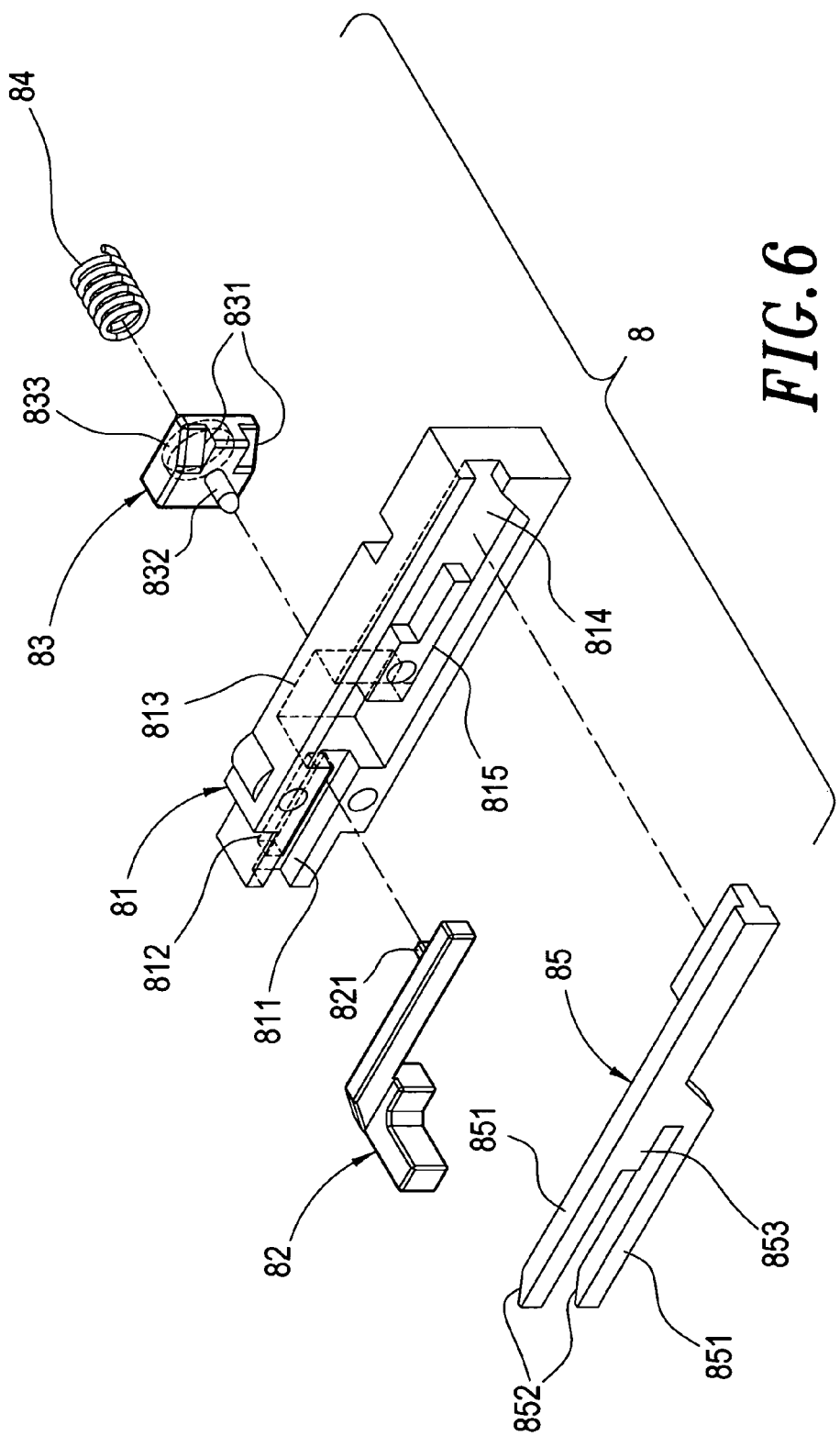
FIG. 6 is a perspective drawing showing an exiting mechanism of a fast hard disk plugging and rejecting device according to the present invention.

Please refer to FIGS. 2~6 showing the fast hard disk plugging and rejecting device according to the present invention. The device includes:

a bottom cover 2 connected to a side covering plate 3 through two sides thereof and to a backside covering plate 4 through a back end thereof, wherein the backside covering plate 4 includes more than one connector 41 disposed thereon;

a panel 5 having a plugging and rejecting opening 51 which has a relatively larger upper space and a relatively smaller lower space and a rotary lifting dust cover 52 mounted thereon, an opening 53 positioned at a proper position of the panel 5 and having an exiting button 54 mounted thereon, wherein the panel 5 is connected with a front end of the bottom cover 2;

a guiding plate 6 positioned at the backside of the panel and comprising guiding rail 61 and 62, which form a relatively larger upper space and a relatively smaller lower space for different standards of hard disks, and a sliding way 63 mounted at a proper position of one side of the guiding plate 6;

one or more connector 7 comprising a front and a back probe insulating bases 71 and 72 which are combined together through a partition 73 there between for stably combining thereof, wherein:

the front probe insulating base 71 comprises plural contacting holes 711, a circular inverted angle 714 mounted at a front end of the contacting hole 711, a probe 712 mounted in the contacting hole 711, and a spring 713 sleeved on a back end of the probe 712, wherein the front end of the probe 712 is broadened for contacting and the elasticity of the spring 713 is employed for ensuring a good connection between the probe 712 and the connecting head 101 of the hard disk 10 (as shown in FIGS. 5A~5B), and the inverted angle 714 at the front end of the contacting hole 711 corrects a connecting way of a connecting head of the hard disk 10 so as to ensure a good connection between the connecting head 101 of the disk 10 and the probe 712; and the back probe insulating base 72 is combined with the back end of the front probe insulating base 71 and comprises a contacting wire 721 set at a center thereof for contacting with the spring 713 behind the probe 712;

an exiting mechanism 8 comprising a body 81, a position measuring rod 82, an orientating element 83, a spring 84 and a linking-up bar 85 (as shown In FIG. 6), wherein:

the body 81 comprises a first sliding trough 811 mounted at one side of a front end thereof, wherein a guiding trough 812 is mounted in the first sliding trough 811, an opening 813 passed through a central portion thereof, and a second sliding trough 814 mounted at one side of a back end thereof, wherein a blocking portion 815 is set in the second sliding trough 814 at a proper position;

the position measuring rod 82 is a L-shaped rod, comprises a guiding pillar 821 extending from a side thereof, and is arranged in the first sliding trough 811 of the front end of the body 81, wherein the guiding pillar 821 of the position measuring rod 82 is arranged in the guiding trough 812 of the first sliding trough 811;

the orientating element 83 comprises an inclined plane 831 respectively on an upper and a bottom portions of one side thereof, an orientating bolt 832 extending from a central portion of the side thereof, a circular hole 833 mounted at the other side thereof, and a spring 84 inside the circular hole 833, wherein the orienting element 83 is arranged in the opening 813 of the body 81 and one end of the spring 84 is rejected in the circular hole 833 and the other end of the spring 84 is rejected against the side covering plate 3; and the linking-up bar 85 comprises two pushing bars 851 respectively having an inclined plane 852 at a front end thereof, and a rejecting portion 853 positioned between the two pushing bars 851, wherein the pushing bars 851 are arranged in the second sliding trough 814 of the body 81 so as to protrude a back end of the linking-up bar 85 out of the body 81 and a facet of the back end of the linking-up bar 85 will be contacted with the exiting button 54 on the panel 5; and a upper cover 9, wherein the bottom cover 2 is assembled thereon so as to form a space there between for positioning each component.

Through the probe and the spring embedded in the contacting hole inside the connector, the probe in the connector 7 and a connecting head 101 of the hard disk 10 will be conducted through a pressed contact there between when the hard disk 10 is plugged therein, and the hard disk can be rejected by utilizing the exiting mechanism 8 for effectively and conveniently plugging and rejecting. The connector 7 of the guiding plate 6 is conducted with the connector 41 of the backside covering plate 4 for receiving a reading by the hard disk of the computer and a power input.

Figure 7:
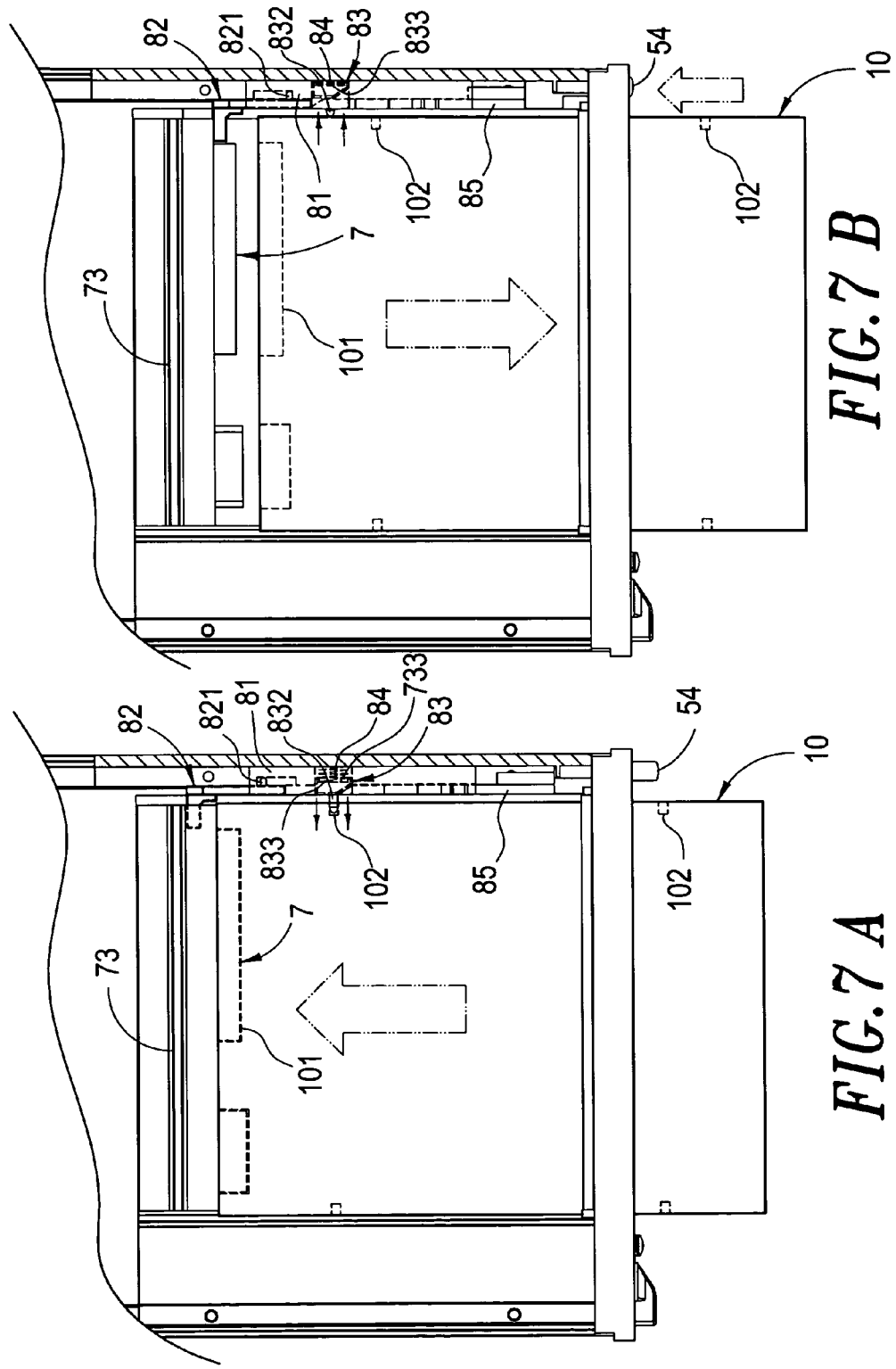
FIGS. 7A~7B are schematic views showing the orientation of a fast hard disk plugging and rejecting device according to the present invention.

Please refer to FIGS. 7A~B which are schematic views showing the orientation of a fast hard disk plugging and rejecting device according to the present invention. When the position measuring rod 82 intend to detect the position of the hard disk 10, the position measuring rod 82 will induce the orientating bolt 832 to plug into a screwing hole 102 at one side of the hard disk 10 as the hard disk 10 arrives a predetermined position, and at this time, all the lines are conducted and part of the hard disk 10 will be exposed to the exterior of rejecting opening 5. When it wants to reject the fixed hard disk 10, the user only needs to press the exiting button 54, and then the exiting button 54 will push the linking-up bar 85, the inclined plane 853 of the linking-up bar 85 will push the inclined plane 831 of the orientating element 83 so as to move the orienting element outwardly, and the orientating bolt 832 of the orienting element 83 will therefore depart from the screwing hole 102 at the side of the hard disk 10. If the user stops to press the exiting button 54, the position measuring rod 82 will be homed so as the linking-up bar 85, and the orientating element will also be homed due to the elasticity of the spring 84. At this time, all the lines are come off, and the hard disk can be taken out.

Figure 8:
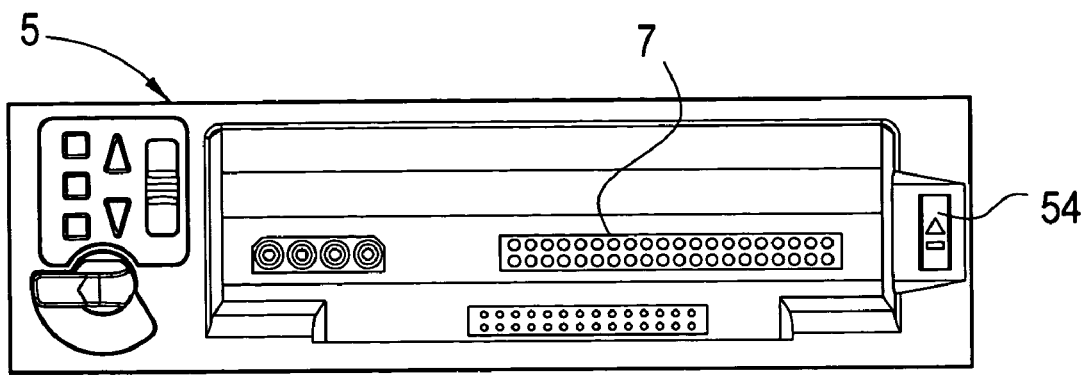
FIGS. 8A~C are practicing views showing a fast hard disk plugging and rejecting device according to the present invention.
Figure 8:
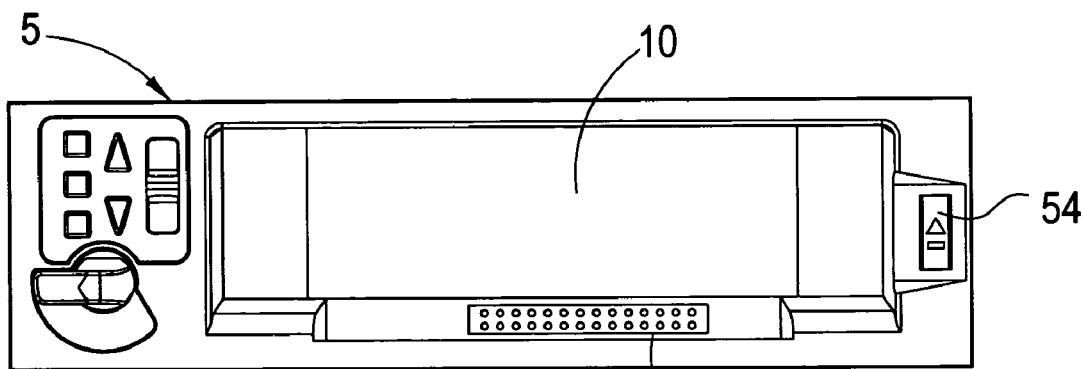
Figure 8:
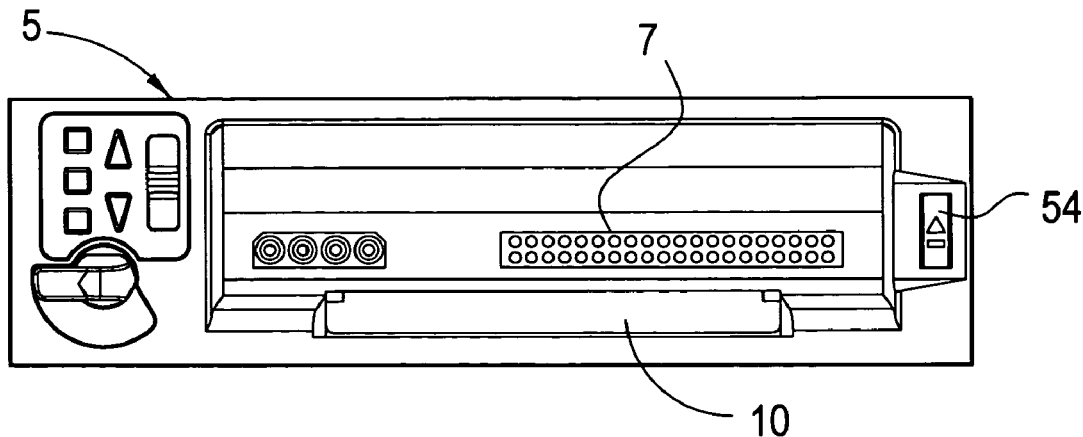

Please refer to FIGS. 8A~8C which practicing views showing a fast hard disk plugging and rejecting device according to the present invention. FIG. 8 shows a condition as the hard disk 10 is unplugged, wherein the connector 7 is set at the upper and lower portions, FIG. 8B shows a condition as a larger standards hard disk 10 is plugged in the connector 7 at the upper portion, wherein the hard disk 10 can be rejected through the exiting mechanism 8, and FIG. 8C shows a condition as a small standards hard disk 10 is plugged in the lower connector 7, wherein the hard disk 10 can be rejected just by hand.

The fast hard disk plugging and rejecting device according to the present invention, when being compared with the other prior arts, further includes the advantages as follows:

1. The present invention provides a fast hard disk plugging and rejecting device outside the case so as to own a good mobility and removability.

2. The present invention provides a fast hard disk plugging and rejecting device employing a guiding rail having a relatively larger upper space and a relatively smaller lower space for adapting different standards of different hard disks in market so as to facilitate the popularization of the present invention.

3. The present invention provides a fast hard disk plugging and rejecting deice, through which the user can easily and effectively reject the hard disk so as to save labor and avoid a damage to the hard disk when the user plugs and rejects the hard disk through the conventional way.

4. The present invention provides a fast hard disk plugging and rejecting deice which employs the elastic probe with the spring made of conductive material for conduction, and the front end of each probe is broadened and the elasticity of the spring ensures a good conduction.

5. Utilizing the connector structure and the orientating method according to the present invention, it can semi-automatically or automatically connect the hard disk for saving the connection time and achieving the purposes of automatic connection, separation and exchange.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A fast plugging and rejecting device for a hard disk, comprising a upper cover, a bottom cover, a panel, a backside covering plate, a side covering plate, a guiding plate, an exiting button, an exiting mechanism and one or more connector, characterized in that:

said guiding plate positioned at the backside of said panel and comprising a guiding rail and sliding way at a proper position of one side of said guiding plate;

said one or more connector comprising a front and a back probe insulating bases which are combined together through a partition there between, wherein said front probe insulating base comprises plural contacting holes, a circular inverted angle mounted at a front end of contacting hole, a probe mounted in said contacting hole, and a spring sleeved on a back end of said probe; and said back probe insulating base is combined with said back end of said front probe insulating base and comprises a contacting wire set at a center thereof for contacting with said spring behind said probe;

said exiting mechanism comprising a body, a position measuring rod, an orientating element, a spring and a linking-up bar;

said body comprising a first sliding trough mounted at one side of a front end thereof, wherein a guiding trough is mounted in said first sliding trough, an opening passed through a central portion thereof, and a second sliding trough mounted at one side of a back end thereof, wherein a blocking portion is set in said second sliding trough;

said position measuring rod being a L-shaped rod, comprising a guiding pillar extending from a side thereof, and arranged in said first sliding trough of said body so as to protrude a front end thereof out of said sliding way of said guiding plate, wherein said guiding pillar is arranged in said guiding trough of said body;

said orientating element comprising an inclined plane respectively on an upper and a bottom portions of one side thereof, an orientating bolt extending from a central portion of the side thereof, a circular hole mounted at the other side thereof, and a spring inside said circular hole, wherein said orienting bolt is arranged in said opening of said body and one end of said spring is rejected in said circular hole and the other end of said spring is rejected against said side covering plate; and said linking-up bar comprising two pushing bars respectively having an inclined plane at a front end thereof, and a rejecting portion positioned between said two pushing bars, wherein said pushing bars are arranged in said second sliding trough of said body so as to protrude a back end of said linking-up bar out of said body and a facet of said back end of said linking-up bar is contacted with said exiting button on said panel;

wherein said probe embedded in said contacting hole inside said connector is an elastic probe, so that said probe in said connector and a connecting head of said hard disk are conducted through a pressed contact there between when said hard disk is plugged therein, and said hard disk is exited by utilizing said exiting mechanism.

2. The fast plugging and rejecting device according to claim 1, wherein said sliding way of said guiding plate has a relatively larger upper space and relatively smaller lower space for being provided for said hard disk with different standard.

3. The fast plugging and rejecting device according to claim 1, wherein said front end of said probe is broadened for contacting and said spring is employed for ensuring a connection between said probe and said connecting head of said hard disk.

4. The fast plugging and rejecting device according to claim 1, wherein said inverted angle at said front end of said contacting hole corrects a connecting way of said hard disk so as to ensure a connection between said connecting head of said disk and said probe.

* * * * *